United States Patent Office 3,111,516
Patented Nov. 19, 1963

---

3,111,516
9α-HALO-11β-HYDROXY-16α,17α-ALKYLIDENE-DIOXY-1,4-PREGNADIENES
Seymour Bernstein, New City, N.Y., and George R. Allen, Jr., Old Tappan, N.J., assignors to American Cyanamid Company, Stamford, Conn., a corporation of Maine
No Drawing. Filed June 15, 1962, Ser. No. 202,708
4 Claims. (Cl. 260—239.55)

This invention relates to new steroid compounds. More particularly, it relates to 16α,17α-substituted methylenedioxy steroids of the progesterone series.

It has been shown in the past that 16α,17α-isopropylidene pregnanes can be prepared from the corresponding 16α,17α-dihydroxy pregnane [Journal of the Chemical Society, 4373 (1955)].

We have now found that substituted methylenedioxy steroids having the following formula have high anti-inflammatory activity.

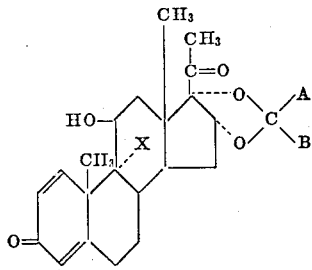

wherein A and B are hydrogen or lower alkyl radicals and X is a halogen atom.

The compounds of the present invention are, in general, crystalline solids and insoluble in water. They are crystallizable from organic solvents such as toluene, benzene, petroleum ether and the like or mixtures of organic solvents such as benzene-toluene, acetone-petroleum ether or acetone-benzene.

The compounds of the present invention are prepared by reacting a steroid having the following structure:

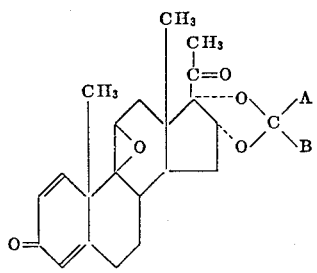

wherein A and B are hydrogen or lower alkyl, with a hydrogen halide such as, hydrogen chloride, hydrogen fluoride and the like. The reaction is usually carried out at a temperature within the range of from about −30 to 50° C. It is usually complete within a period of from about one hour to about twenty-four hours.

The compounds of the present invention are physiologically active possessing glucocorticoid and anti-inflammatory activity. They can be used systemically and topically in the treatment of rheumatoid arthritis, burns, allergies, psoriasis and other skin disorders. They are also useful as intermediates in preparing other physiologically active steroids. For example, transformation can be carried out on the steroid moiety and the 16α,17α-dihydroxy progesterone regenerated by treatment with acid as shown in the examples hereinafter. Thus, the 16α,17α-isopropylidenedioxy grouping serves as a protective grouping for preventing D-homoannulation during ring C transformations, for example, the preparation of the 9β,11β-epoxide.

This application is a continuation-in-part of our co-pending application Serial No. 720,564, filed March 11, 1958, now abandoned.

The following examples describe the present invention in greater particularlity and are intended to be by way of illustration and not limitation.

EXAMPLE 1

*Preparation of 9α-Bromo-11β-Hydroxy-16α,17α-Isopropylidene Dioxy-1,4-Pregnadiene-3,20-Dione*

A solution of osmium tetroxide (10 g.) in benzene (200 ml.) is added dropwise (one drop per second) with stirring to a solution of 4,9(11),16-pregnatriene-3,20-dione (11.6 g.) in benzene (340 ml.) and pyridine (6 ml.). After addition, stirring is continued for one hour. Methanol (380 ml.) is added, followed by a solution of sodium sulfite (54 g.) and potassium hydrogen carbonate (54 g.) in water 560 ml.). The mixture is stirred for three hours and then further for one-half hour after addition of chloroform (500 ml.). The organic layer is separated from the filtered reaction mixture and combined with the chloroform extracts (3 x 250 ml.) of the aqueous layer, the chloroform having been previously used in washing the filter cake. The combined chloroform is washed with water (500 ml.), dried over anhydrous magnesium sulfate and removal of solvent gives a greenish-yellow solid which is washed with a little methanol and dried. The solid which is recovered weighs 11 grams and melts at 209–215° C. A specimen of this material crystallizes as prisms, melting point 211–215° C. from chloroform methanol. The same specimen melts at 215–220° after being dried overnight at the temperature of boiling xylene.

One gram of the product of the foregoing reaction, 16α,17α-dihydroxy-4,9(11)-pregnadiene-3,20-dione, is dissolved in acetone (25 ml.). Hydrochloric acid (three drops, d. 1.19) is added to the solution which is then boiled gently for two minutes. After the reaction mixture is kept at room temperature for eighteen hours, the product is separated by addition of water (75 ml.) followed by ether extraction (3 x 50 ml.), the combined extracts being washed with aqueous sodium hydrogen carbonate solution (50 ml.), water (50 ml.) and then is dried over anhydrous sodium sulfate. The 16α,17α-isopropylidenedioxy derivative recovered melts at 200–201° C.

A solution of 25 ml. of 1 N sodium methoxide in 100 ml. of anhydrous benzene is distilled until 75 ml. of distillate is collected. The residual mixture is allowed to cool to room temperature, diluted with 40 ml. of benzene and is treated with 6.00 g. (0.041 mole, 5.54 ml.) of ethyl oxalate during which time the mixture is stirred magnetically. The solid immediately dissolves and 9.30 g. (0.024 mole) of 16α,17α-isopropylidenedioxy-4,9(11)-pregnadiene-3,20-dione, the product of the previous reaction, is added. The solution becomes darker; and after one hour solid begins to precipitate from the solution. The mixture is stirred at room temperature for twenty-one hours. One hundred milliliters of ether is added, and the mixture is stirred for one hour. An additional 200 ml. of ether is added, and stirring is continued for three hours. The mixture is filtered to give 6.74 g. of crude sodium salt of 2-ethoxyoxalyl-16α,17α-isopropylidenedioxy-4,9(11)-pregnadien-3,20-dione. The filtrate is evaporated to a syrup which is triturated with 100 ml. of ether. Filtration gives an additional 2.735 g. of the crude sodium salt.

The above batches of crude sodium salt are combined and dissolved in 400 ml. of water. The turbid solution is filtered, and the filtrate is acidified with 5% hydrochloric acid solution. The precipitate is collected by filtration and dried over phosphorus pentoxide to give 7.919 g. of pale yellow amorphous solid.

A solution of 3.20 g. (0.0326 mole) of potassium acetate in 100 ml. of methanol is chilled in an ice-bath during magnetic stirring. The product [7.917 g. (0.0163 mole)], described in the previous paragraph, 2-ethoxyoxalyl-16α,17α-isopropylidenedioxy - 4,9(11) - pregnadiene-3,20-dione is added to the potassium acetate solution using 20 ml. of methanol to aid in the transfer. A 19.8 ml. aliquot of a solution prepared by diluting 6.60 g. of bromine to 50 ml. volume with carbon tetrachloride is added dropwise over 50 minutes (the aliquot being equivalent to 0.0163 mole). The resulting turbid yellow solution is treated with 100 mg. of phenol and 16.3 ml. of 1 N sodium methoxide in methanol. The solution is allowed to reflux during ten minutes on a steam bath and then is chilled in an ice bath. The crystals are collected by filtration, yield: 4.732 g. of pale yellow solid melting at 175–179° C. (dec.). An additional 2.420 g. of crystals melting at 179–183° C. (dec.) is recovered from the mother liquor. The material can be used for subsequent work without further purification.

A sample (0.500 g.) of the material described in the foregoing paragraph is dissolved in 7 ml. of benzene and chromatographed on 15 g. of silica gel (column size: 16 x 140 mm.). The column is washed with 100 ml. of benzene and the washings discarded. The column is then washed with 250 ml. of solution of three parts ether and 97 parts benzene. Fifty milliliter percolates are collected and percolates 2, 3 and 4 are combined and concentrated to dryness under reduced pressure. The residue is dissolved in methanol and recrystallized giving 0.303 g. of glistening white plates melting at 177–179° C. (dec.). When this material is dried under reduced pressure at 56° for two hours, it becomes colored. Consequently, the analytical sample is dried at room temperature.

A solution of 7.243 g. (0.0156 mole) of the product described in the previous paragraph in 15 ml. of 2,4,6-collidine is refluxed for 45 minutes. A solid begins precipitating from the solution almost immediately and the mixture becomes dark. The cooled mixture is diluted with sufficient ether to make the total volume 80 ml. Filtration gives crude 2,4,6-collidine hydrobromine which is washed with 100 ml. of ether. The washing and filtrate are combined, and the resulting solution is washed first with 10% sulfuric acid and then with water. The washes are combined and extracted with 100 ml. of ether. The ether solutions are then combined and dried over a mixture of activated charcoal and anhydrous magnesium sulfate. The mixture is filtered and concentrated to dryness, giving 3.231 g. of needles melting at 196.0–198.5° C. A sample is recrystallized three times from acetone-petroleum ether to give purified 16α,17α-isopropylidenedioxy - 1,4,9(11) - pregnatriene-3,20-dione in the form of fine white needles melting at 204.5–205.5° C.

A solution of 2.179 g. (5.7 mol.) of 16α,17α-isopropylidenedioxy-1,4,9(11)-pregnatriene - 3,20 - dione in 62 ml. of peroxide-free dioxane and 12 ml. of water is chilled to 15° C. The solution is treated with 10.7 ml. of 20% perchloric acid solution and 0.980 g. (7.1 moles) of N-bromoacetamide. The solution is then allowed to stand at room temperature for thirty minutes, treated with 25 ml. of saturated sodium sulfite solution, and diluted with sufficient water to make the total volume 250 ml. This mixture is extracted three times with 150 ml. each time of methylene chloride. The three extracts are dried over magnesium sulfate and concentrated to about 15 ml. in volume. The solid which separates is collected by filtration and washed with 10 ml. of methanol to give 1.585 g. of crystals melting at 218–221° C. (dec.) (after darkening from 195° C.). The mother liquor gives an additional 0.25 g. of product. The product is recrystallized from acetone to give white crystals melting at 219.0–220.5° C. (dec.), (after darkening from 195° C.); $[\alpha]_D^{25}$ +115° (chloroform); ultraviolet spectrum:

$$\lambda_{max.}^{MeOH} \ 242 \ m\mu \ (\epsilon \ 14{,}700)$$

EXAMPLE 2

Preparation of 9α-Fluoro-11β-Hydroxy-16α,17α-Isopropylidenedioxy-1,4-Pregnadiene-3,20-Dione A solution of 1.20 g. (2.5 mols) of the product of Example 1, 9α-bromo-11β-hydroxy16α,17α-isopropylidenedioxy-1,4-pregnadiene-3,20-dione, and 1.20 g. of anhydrous potassium acetate in 180 ml. of ethanol is refluxed for sixteen hours. The solution is concentrated to near dryness, and the moist residue is triturated with 50 ml. of water. The mixture is filtered to give 0.947 g. of near white solid melting at 238–242° C.

A solution of 0.636 g. (1.69 mols) of the product of the previous paragraph, 9β,11β-epoxy-16α,17α-isopropylidenedioxy-1,4-pregnadiene-3,20-dione in 6 ml. of methylene chloride and 10 ml. of tetrahydrofuran is chilled to −30° C. while in a stainless steel bomb. To this solution there is added a solution of five ml. of hydrogen fluoride in 5 ml. of methylene chloride, the solution having been chilled to −30° C. The bomb is sealed and shaken at 5° C. for eighteen hours. The contents of the bomb are poured into 100 ml. of saturated sodium bicarbonate solution contained in a stainless steel beaker, the bomb is rinsed with 60 ml. of chloroform twice, and the rinsings are combined with the above mixture. The organic layer of the two-phase system is separated and washed twice with 50 ml. each time of saturated sodium chloride solution. The washed solution is concentrated to dryness under vacuum, and the moist residue is triturated with 7 ml. of acetone. The mixture is filtered to give 0.488 g. of a solid melting at 294–296° C. (dec.). The material is recrystallized from acetone-petroleum ether to give shiny white platelets melting at 294–296° C. (dec.); $[\alpha]_D^{25}$ +102° (chloroform); ultraviolet spectrum:

$$\lambda_{max.}^{MeOH} \ 238 \ m\mu \ (\epsilon \ 15{,}500)$$

EXAMPLE 3

Preparation of 9α-Chloro-11β-Hydroxy-16α,17α-Isopropylidenedioxy-1,4-Pregnadiene-3,20-Dione To a solution of 0.400 g. (1.0 mol.) of 9β,11β-epoxy-16α,17α-isopropylidenedioxy-1,4-pregnadiene - 3,20-dione in 20 ml. of chloroform there is added 10 ml. of chloroform which has been saturated with hydrogen chloride at 5° C. The resulting solution is allowed to stand at 0° for four hours, after which the solution is concentrated to dryness under reduced pressure at 25–30° C. The solid residue is triturated with 10 ml. of acetone and then filtered to give 0.386 g. of white solid. This solid is recrystallized from β-methoxyethanol to give 0.375 g. of 9α - chloro-11β-hydroxy-16α,17α-isopropylidene-dioxy-1,4-pregnadiene-3,20-dione in the form of white crystals melting at 288–290° C. (dec.), after darkening from 255° C., $[\alpha]_D^{25}$ +125° (chloroform); ultraviolet spectrum;

$$\lambda_{max.}^{MeOH} \ 238 \ m\mu \ (\epsilon \ 15{,}200)$$

EXAMPLE 4

Preparation of 9α-Fluoro-11β,16α,17α-Trihydroxy-1,4-Pregnadiene-3,20-Dione

A mixture of 0.318 g. of 9α-fluoro-11β-hydroxy-16α,17α-isopropylidenedioxy-1,4-pregnadiene - 3,20 - dione, 40 ml. of methyl alcohol, 15 ml. of water and 5 ml. of hydrochloric acid (37%) is allowed to reflux during a three hour period. The solution is diluted with 40 ml. of water and concentrated under reduced pressure on the steam bath until a solid begins to separate. This material is collected by filtration and dried under reduced pressure over phosphorous pentoxide to give 0.233 g. of a white solid melting at 268–283° C. with decomposition. The product is recrystallized from acetone-petroleum ether to give 0.130 g. of white needles melting at 291–293° C., dec. An analysis of the product shows that the values for carbon, hydrogen and fluorine agree closely with the theoretical value.

EXAMPLE 5

*Preparation of 9α-Bromo-11β,16α,17α-Trihydroxy-1,4-Pregnadiene-3,20-Dione*

A mixture of 0.479 g. of 9α-bromo-11β- hydroxy-16α, 17α-isopropylidenedioxy - 1,4 - pregnadiene - 3,20 - dione, 80 ml. of methanol, 30 ml. of water and 5 ml. of hydrochloric acid (37%) is allowed to reflux on the steam bath for three hours. After one hour an additional 20 ml. of methanol is added. The hot mixture is filtered and the filtrate is diluted with 40 ml. of water and chilled in an ice bath. The solid is collected by filtration and dried under reduced pressure over phosphorous pentoxide to give 0.279 g. of white solid melting at 226–228° C. dec., after darkening from 220° C.

The filtration is diluted with an additional 40 ml. of water and concentrated under reduced pressure on the steam bath to turbidity and chilled in an ice bath. This gives an additional 0.15 g. of solid melting at 215° C. dec.

EXAMPLE 6

*Preparation of 9α-Chloro-11β,16α,17α-Trihydroxy-1,4-Pregnadiene-3,20-Dione*

A mixture of 0.266 g. of 9α-chloro-11β-hydroxy-16α, 17α-isopropylidenedioxy-1,4-pregnadiene-3,20 - dione, 32 ml. of methanol, 12 ml. of water and 4 ml. of hydrochloric acid (37%) is allowed to reflux for one hour. As all solids are not dissolved, methanol (25 ml.) is added with refluxing continuing for two hours longer. The hot mixture is filtered to give 0.08 g. of white crystals, melting point 285–286° C. dec., after darkening from 245° C.

The filtrate is extracted with methylene dichloride (2 x 100 ml.) after being concentrated under reduced pressure to about 25 ml. volume. The combined extracts are dried over magnesium sulfate and evaporated to dryness. The solid residue is dissolved in 25 ml. of the lower and 25 ml. of the upper phase of the system: cyclohexane:dioxane:water (3:5:1); all solids do not dissolve. The mixture is filtered and the solids is dried to give 38 mg. of crystals, melting point 275–281° C. dec. The filtrate is mixed thoroughly with 50 g. of diatomaceous earth and this mixture is packed on a column which should be prepared from 200 g. of diatomaceous earth and 100 ml. of the solvent system described above. The column (38 x 68 cm.) is eluted with the upper phase of the solvent system and the effluent is allowed to pass through a recording spectrophotometer which should be set at 240 mμ. A small amount of material having absorption in the wave length is diluted in the first 32 ml. and this material is discarded. The next 128 ml. contains more ultraviolet absorbing material, called Fraction A. The following 290 ml. contains no ultraviolet absorbing material. The next 299 ml. contains additional ultraviolet absorbing material, called Fraction B. The following 179 ml. contains no ultraviolet absorbing material.

Fraction A is taken to dryness to give 58 mg. of white solid. This material is recrystallized from chloroform-petroleum ether to give 0.047 g. of white needles, melting point 284–286° C., dec. after darkening from 270° C.

Fraction B is taken to dryness to give 48 mg. of white solid. This material is recrystallized from acetone-petroleum ether to give 48 mg. of white solid, melting point 242–243° C., dec. An analysis of the product for carbon, hydrogen and chlorine shows that the values agree closely with the theoretical values of $C_{21}H_{27}ClO_5$.

We claim:

1. A compound of the formula:

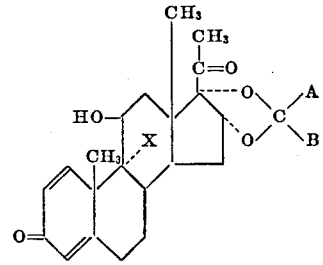

wherein A and B are selected from the group consisting of hydrogen and lower alkyl radicals and X is a halogen atom.

2. The compound 9α-bromo-11β-hydroxy-16α,17α-isopropylidenedioxy-1,4-pregnadiene-3,20-dione.

3. The compound 9α-fluoro-11β-hydroxy-16α,17α-isopropylidenedioxy-1,4-pregnadiene-3,20-dione.

4. The compound 9α-chloro-11β-hydroxy-16α,17α-isopropylidenedioxy-1,4-pregnadiene-3,20-dione.

References Cited in the file of this patent

UNITED STATES PATENTS

| | | |
|---|---|---|
| 2,837,464 | Nobile | June 3, 1958 |
| 2,975,172 | Fried | Mar. 14, 1961 |